July 13, 1954 E. J. BACINO 2,683,612
DETACHABLE MUD FLAP FOR VEHICLES
Filed June 23, 1952

INVENTOR
E. J. BACINO,
BY Ogle R. Singleton
ATTORNEY

Patented July 13, 1954

2,683,612

UNITED STATES PATENT OFFICE 2,683,612

DETACHABLE MUD FLAP FOR VEHICLES

Eigel Joseph Bacino, Kennett Square, Pa.

Application June 23, 1952, Serial No. 295,059

4 Claims. (Cl. 280—154.5)

My invention consists in a new and useful improvement in mud flaps and is designed to provide a readily detachable flap as a splash guard for the wheels of motor trucks, tractors and trailers. Heretofore, mud flaps have been provided for trucks, which were attached permanently to the truck, giving rise to several undesirable results. The main objection to a non-removable flap is interference of the flap when the truck is being backed over a rough field, catching the flap under the wheel and ripping the flap off. Also there is interference of the flap when the truck is used for dumping a load, catching the flap under the dumped load or under the rear wheel when the truck is backed during the dumping in an effort to push the dumped load into a higher pile, as is sometimes necessary.

The object of this invention is to provide an easily removable and easily attachable mud flap, for the purpose of operating a truck economically, both on and off highways when flaps are legally required and when the truck can be operated without flaps, respectively.

To this end, this invention provides an easily removable flap. To accomplish easy removal, the flap is molded or formed with a T head which slides into an open channel mounted permanently under the body of the truck just behind the rear wheel, either by flat head screws through countersunk holes in the channel directly into the body, or by use of mounting brackets to secure the channel to the body in a level position, where there may be obstructions. The T head of the flexible flap is entered into the channel and slides all the way in until it comes to a stop at the end of the channel and where it may be secured by a simple snap lock. For durability, the T head of the flap is re-inforced by a metal insert molded in the T head at the time of manufacture, and also for further durability cords are molded within the flexible flap, running from the metal insert.

While I have illustrated in the drawing and hereinafter fully describe one specific embodiment of my invention, it is to be distinctly understood that I do not consider my invention to be limited to said specific embodiment but refer for its scope to the claims appended hereto.

Figure 1:
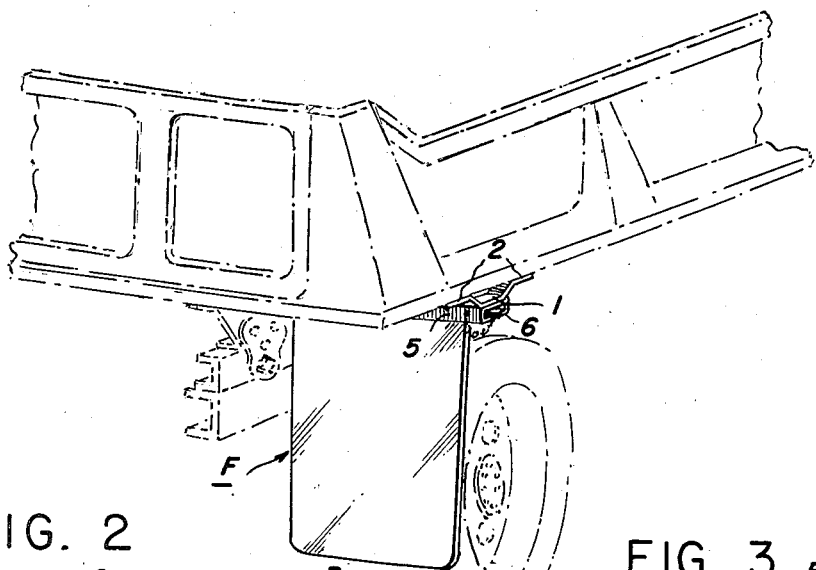
Fig. 1 is a perspective of my improved mud flap applied to a dump truck, a portion of the truck being shown in broken lines.
Figure 2:
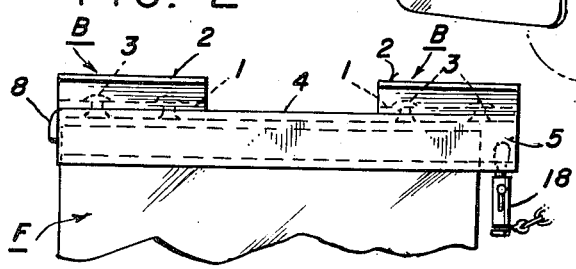
Fig. 2 is a fragmentary rear elevation of the mud flap and the mounting means.

As shown in the drawing, my improved mud flap F is mounted on the truck by means of brackets B, each of which comprises a plate 1 having lateral wings 2 which are bolted, welded or otherwise suitably attached to the body of the truck immediately aft of the wheel. A trackway W is removably attached by suitable fastening means such as bolts 3, depending from the plates 1. The trackway W comprises a top plate 4, sides 5, 5, and support rails 6, 6 spaced to provide a slot 7. The plate 4 has at its inner end a depending lug 8 (Fig. 2).

Figure 4:
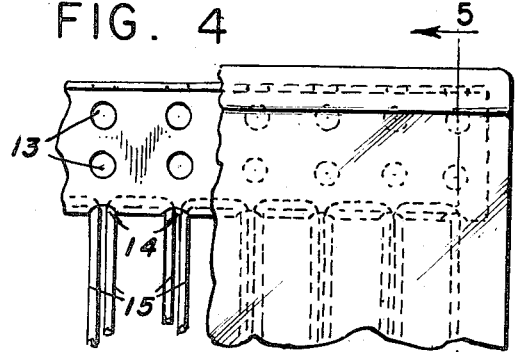
Fig. 4 is a fragmentary elevation of the mud flap.
Figure 5:
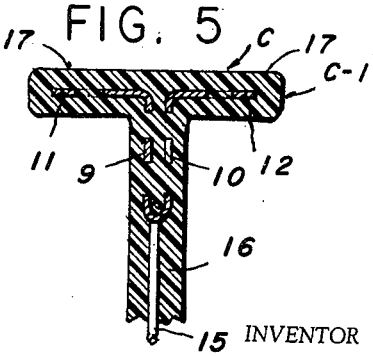
Fig. 5 is a vertical section on the line 5—5 of Fig. 4 in the direction of the arrows.

The flap F comprises a core C and a casing C-1 molded on the core C (Fig. 5). The core C is a plate of suitable rigid material having the reversely bent portions 9 and 10 and the lateral portions 11 and 12 normal to the portions 9 and 10 forming a T head, in cross-section. The core C has a plurality of openings 13 through the plates 9 to 12. A row of openings 14 is formed in the bent lower edge of the core C. Re-inforcing flexible cords 15 are threaded through the holes 14 and depend from the core C (Fig. 4). The casing C-1 of any suitable flexible material is molded on the core C and cords 15, to form the body 16 and the wings 17 of the mud flap F. Any suitable form of removable stop, such as a snap-hook 18, may be mounted in one of the rails 6 to retain the flap F in the trackway W.

Figure 3:
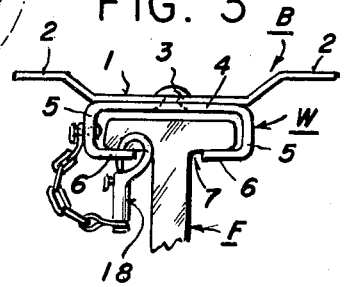
Fig. 3 is a side elevation of the parts shown in Fig. 2.

From the foregoing description of the structure of my improved mud flap, its use and operation is obvious. When the truck is to travel on a highway where mud flaps are required, the flap F can be readily mounted by sliding the wings 17 of the casing C-1 along the rails 6 of the trackway W (Fig. 3) until the flap F is seated against the lug 8 (Fig. 2). The snap-hook 18 is then fastened in one of the rails 6 outboard of the flap F to retain the flap F in the trackway W. When the truck leaves the highway and the mud flaps are no longer required, the flap F can be readily dismounted by removing the snap-hook 18 and sliding the wings 17 outwardly along the rails 6.

Having described my invention, what I claim is:

1. In a removable mud flap for a wheel of a vehicle, the combination of a channel member removably attached to and depending from the vehicle, said member comprising a top, sides and bottom rails relatively spaced to provide a slot therebetween; and a flap comprising a core and a casing on said core, said core comprising a rigid plate having a pair of reversely bent depending portions and a pair of lateral portions extending from the upper ends of said depending portions normal thereto, and said casing comprising a flexible body with a pair of lateral wings extending from the upper ends of the sides of the body, respectively, normal thereto, the parts being so dimensioned that the body of the casing can be passed in the slot between said rails and the wings of the body are disposed on the rails.

2. In a removable mud flap for a wheel of a vehicle, the combination of a pair of brackets, each of said brackets having a pair of lateral wings for attachment to a vehicle; a channel member removably attached to and depending from said brackets, said member comprising a top, sides and bottom rails relatively spaced to provide a slot therebetween; and a flap comprising a core and a casing molded on said core, said core comprising a rigid plate having a pair of reversely bent depending portions and a pair of lateral portions extending from the upper ends of said depending portions normal thereto, and said casing comprising a flexible body with a pair of lateral wings extending from the upper ends of the sides of the body, respectively, normal thereto, the parts being so dimensioned that the body of the casing can be passed in the slot between said rails and the wings of the body are disposed on the rails.

3. In a mud flap for a vehicle wheel, the combination of a member removably attached to and depending from the vehicle, said member having a pair of rails relatively spaced to provide a slot therebetween; and a flap comprising a plate having a pair of lateral portions extending from its upper end and a body with a pair of lateral wings covering said portions, respectively, the parts being so dimensioned that the flap can be passed in the slot between said rails and the wings of the body are disposed on said rails.

4. In a mud flap for a vehicle wheel, the combination of a pair of brackets, each of said brackets having a pair of lateral wings for attachment to a vehicle; a member removably attached to and depending from said brackets, said member having a pair of rails relatively spaced to provide a slot therebetween; and a flap comprising a plate having a pair of lateral portions extending from its upper end and a body with a pair of lateral wings covering said portions, respectively; the parts being so dimensioned that the flap can be passed in the slot between said rails and the wings of the body are disposed on said rails.

References Cited in the file of this patent

UNITED STATES PATENTS

| Number | Name | Date |
|---|---|---|
| 1,363,321 | Jaeger | Dec. 28, 1920 |
| 1,809,711 | Kile | June 9, 1931 |
| 2,486,032 | Jimenez | Oct. 25, 1949 |
| 2,546,781 | Rheeling | Mar. 27, 1951 |
| 2,619,363 | Wenham | Nov. 25, 1952 |